(12) United States Patent
Jabusch

(10) Patent No.: US 12,187,221 B2
(45) Date of Patent: *Jan. 7, 2025

(54) SEAT-BELT RETRACTOR

(71) Applicant: Autoliv Development AB, Vargarda (SE)

(72) Inventor: Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 287 days.

This patent is subject to a terminal disclaimer.

(21) Appl. No.: 17/756,402

(22) PCT Filed: Nov. 25, 2020

(86) PCT No.: PCT/EP2020/083284
§ 371 (c)(1),
(2) Date: May 24, 2022

(87) PCT Pub. No.: WO2021/105160
PCT Pub. Date: Jun. 3, 2021

(65) Prior Publication Data
US 2023/0001883 A1    Jan. 5, 2023

(30) Foreign Application Priority Data

Nov. 26, 2019   (DE) ........................ 10 2019 218 306

(51) Int. Cl.
*B60R 22/405*   (2006.01)
*B60R 22/343*   (2006.01)
*B60R 22/46*    (2006.01)

(52) U.S. Cl.
CPC ............ *B60R 22/46* (2013.01); *B60R 22/343* (2013.01); *B60R 22/405* (2013.01); *B60R 2022/4666* (2013.01)

(58) Field of Classification Search
CPC ..... B60R 22/46; B60R 22/343; B60R 22/405; B60R 2022/4666
See application file for complete search history.

(56) References Cited

U.S. PATENT DOCUMENTS 11,866,000 B2 *  1/2024  Jabusch ................. B60R 22/46
2001/0045483 A1  11/2001  Tanaka et al.
(Continued)

FOREIGN PATENT DOCUMENTS

DE       19927731 C2     10/2002
DE     102018103289 A1    8/2019
(Continued)

*Primary Examiner* — Sang K Kim
(74) *Attorney, Agent, or Firm* — DICKINSON WRIGHT PLLC

(57) ABSTRACT

A seat-belt retractor comprising a seat-belt spindle, on which a seat-belt can be wound and which is rotatably mounted in a housing that can be fixedly secured to the vehicle, an electric motor for driving the seat-belt spindle in a rotational motion, and a gear mechanism that transmits the rotational motion from the electric motor to the seat-belt spindle, where a first blocking device is provided, which, when activated, blocks at least one of the parts of the gear mechanism, thereby activating the gear mechanism; and the first blocking device can be activated by a signal-controlled actuator, the actuator, in a second function, activating a second blocking device when a pre-defined feed-out acceleration of the seat-belt, or a pre-defined vehicle deceleration is exceeded.

9 Claims, 3 Drawing Sheets

(56) References Cited

U.S. PATENT DOCUMENTS

| | | |
|---|---|---|
| 2004/0108155 A1 | 6/2004 | Mori et al. |
| 2020/0047711 A1* | 2/2020 | Jabusch .............. B60R 22/4628 |
| 2020/0130641 A1* | 4/2020 | Jabusch ................. B60R 22/46 |
| 2023/0234533 A1* | 7/2023 | Jabusch ................. B60R 22/46 242/396.2 |

FOREIGN PATENT DOCUMENTS

| | | |
|---|---|---|
| EP | 1178906 B1 | 5/2004 |
| EP | 1498326 A1 | 1/2005 |
| EP | 1504971 A2 | 2/2005 |
| WO | 03/099619 A2 | 12/2003 |
| WO | 2011148772 A1 | 12/2011 |

* cited by examiner

SEAT-BELT RETRACTOR

CROSS-REFERENCE TO RELATED APPLICATIONS

This application is a 35 U.S.C. § 371 national phase of PCT International Application No. PCT/EP2020/083284, filed Nov. 25, 2020, which claims the benefit of priority under 35 U.S.C. § 119 to German Patent Application No. 10 2019 218 306.9, filed Nov. 26, 2019, the contents of which are incorporated herein by reference in its entirety.

FIELD

The present invention relates to a belt retractor having the features of the preamble of claim 1.

BACKGROUND

Belt retractors have as basic components a load-bearing frame and a belt reel which is rotatably mounted in the frame and onto which a safety belt can be wound. The frame serves not only for mounting the belt reel but also for fastening to a seat structure or to a vehicle structure and for this purpose is made of a correspondingly thick steel sheet which is bent into a U-shaped frame.

Vehicle seats having safety belt devices are known, for example, in the use as front seats in convertibles, in which at least the belt retractors of the safety belt devices are fastened in the backrests of the vehicle seats. In this case, due to the lack of a load-bearing B-pillar and for reasons relating to access to the rear seats or for reasons relating to distance from the rear vehicle structure, the belt retractors are preferably integrated into the backrests of the vehicle seats which must therefore also be designed to absorb the tensile forces acting in the case of restraint. The belt retractors themselves have all the basic components of a standard belt retractor and are equipped only with various additional subassemblies provided especially for installation in the backrest, such as a self-aligning inertia sensor.

In its basic design, the vehicle seat has a seat structure consisting of several load-bearing structural parts which serve to fasten the vehicle seat to the vehicle structure. The seat structure is equipped with springs and cushioning in order to improve sitting comfort and is also used for the fastening of further components, such as various seat adjustment mechanisms, including the associated electric motors and further components, such as heating devices, sensors, displays, headrests and the like.

In modern vehicles with autonomous driving systems, there is an increasing demand for greater adjustability of vehicle seats in various orientations and positions so that the vehicle occupant can use the freedom obtained by autonomous driving, for example, for more meaningful communication with the other occupants, for extended and more intensive rest phases or even for work, and can orient the vehicle seat accordingly. As a result, the safety belt device and in particular the belt retractor no longer have to be fastened to the vehicle structure as heretofore but rather to the vehicle seat, as has already been the case, for example, with the front seats of convertibles.

Furthermore, belt retractors in modern safety belt devices are provided with electric motors, which, when activated, drive the belt shaft, for example for reversible belt tightening in the winding direction. The electric motor is also fastened to the frame and is arranged laterally of the belt shaft with a drive shaft oriented parallel to the axis of rotation of the belt shaft. Furthermore, it is known to provide a gear mechanism between the belt shaft and the electric motor, by means of which gear mechanism the rotational speed of the electric motor is converted into a predefined rotational speed of the belt shaft. The use of the gear mechanism also makes it possible to use an electric motor that is as compact as possible with a high rotational speed. Overall, a belt retractor with an increased installation space requirement is thus produced despite the use of the compact electric motor made possible by the gear mechanism. Such a belt retractor is known, for example, from publication WO 03/099619 A2.

If the belt shaft is to be driven at different rotational speeds and torques, further gear stages must be provided, which further increase the installation space requirement. Such a belt retractor is known, for example, from publication DE 199 27 731 C2.

Since the installation spaces available on the seat structure of the vehicle seats or in general in very small vehicles are very limited in their size and cannot be enlarged as desired for design reasons, the arrangement of such a belt retractor on the vehicle seat or even in a small vehicle is generally problematic.

SUMMARY

Against this background, the object of the invention is to create an improved belt retractor having an electric motor and a gear mechanism with a reduced installation space requirement.

In order to achieve the object, a belt retractor with the features of claim 1 is proposed. Further preferred developments of the invention can be taken from the dependent claims, the figures and the associated description.

According to the basic concept of the invention, it is proposed according to claim 1 that a first blocking device is provided, which, when activated, blocks at least one of the parts of the gear mechanism and thereby activates the gear mechanism, and the blocking device can be activated by a signal-controlled actuator, wherein the actuator, in a second function, activates a second blocking device when a predefined pull-out acceleration of the safety belt is exceeded or a predefined vehicle deceleration is exceeded.

By blocking the part of the gear mechanism via the first blocking device, the gear mechanism is switched to transmit another rotational speed or another tensile force acting on the safety belt, the electric motor is subsequently used practically for another function. Thus, in a first function when the part of the gear mechanism is not blocked by the first blocking device, the belt strap can be wound with a low retraction force, for example for retraction into the parking position after unbuckling. In this case, no counterforce to be overcome is applied by the safety belt apart from its own weight and the frictional forces, and a very low retraction force is completely sufficient. To switch the gear mechanism, the first part of the gear mechanism is blocked and thus the first force transmission path is interrupted so that the rotational movement is subsequently transmitted only with the activation of the gear mechanism at a different rotational speed. If the rotational speed is reduced, it is possible, for example, to operate the electric motor at a very much higher rotational speed, and then to reduce this high rotational speed to a lower rotational speed via the gear mechanism, but a very much higher retraction force is transmitted, for example, for reversible belt tightening. According to the invention, in order to switch the gear mechanism or to actuate the first blocking device, an actuator is used, which is additionally also used to actuate a second blocking device when a predefined belt strap pull-out acceleration or vehicle deceleration is detected, that is to say to block the belt shaft according to the statutory requirements. In other words, only one further blocking device is provided for switching the gear mechanism, and this further blocking device is then activated by the already present actuator in the presence of a corresponding signal for switching the gear mechanism.

Preferably, the first blocking device comprises a first blocking pawl, which, when activated, blocks at least one part of the gear mechanism in the pull-out direction of the safety belt by engagement in a first toothing of the housing.

Furthermore, the second blocking device preferably comprises a second blocking pawl, which, when activated, blocks the belt shaft in the pull-out direction of the safety belt by engagement in a second toothing of the housing.

It is further proposed that the first and second blocking devices have two independent control disks, which each have a control contour and each have a toothing, which are rotatably mounted and spring-loaded by means of a spring in the unwinding direction of the belt shaft, wherein the first and second blocking pawls bear against the control contour and, when a movement of the control disks relative to the blocking pawls is executed, execute a movement forced by the control contour, wherein the actuator has a blocking lever which can be deflected in a signal-controlled manner and activates the first and second blocking devices by engaging in the toothings of the control disks and by means of a relative movement of the control disks forced counter to the force of the spring.

Overall, a very compact design of the belt retractor can thereby be realized, in which one and the same actuator is used for activating both blocking devices. The control disk and the two blocking pawls can be structurally identical, and therefore an identical structure of the blocking devices and the control disks is realized in relation to these assemblies.

It is further proposed that the gear mechanism is formed by a planetary gear mechanism. Planetary gear mechanisms are characterized in that they allow a very compact structure with simultaneously high reduction ratios.

In this case, the belt shaft is preferably connected for conjoint rotation to a planet carrier, which is a carrier of a plurality of toothed planet gears mounted rotatably thereon, and the part which can be blocked by the first blocking device is preferably a toothed ring gear in which the toothings of the planet gears mesh. The ring gear thus forms the switching part of the gear mechanism which, in the non-blocked state, can rotate relative to the belt shaft, so that the gear mechanism can execute the drive movement as an assembly or as a block. In this case, the rotational drive movement of the electric motor is transmitted to the belt shaft 1:1. Only by the blocking of the ring gear are the planet gears forced to rotate and revolve relative to the ring gear due to the further operating drive torque. The gear mechanism is thus practically activated, and the rotational drive movement of the electric motor is reduced to a lower rotational speed of the belt shaft via the planetary stages.

In particular, the planetary gear mechanism can be a multi-stage, preferably a 3-stage planetary gear mechanism. As a result of the multi-stage configuration of the gear mechanism, further increased reduction ratios can be realized without the outer dimensions and in particular the outer diameter of the gear mechanism being increased thereby.

The stages of the planetary gear mechanism can each have sun gears and planet gears with identical diameters. Each stage has the same reduction ratio so that identical load conditions act in the stages when the gear mechanism is activated. Furthermore, the number of parts can be increased and the associated manufacturing costs per part can be reduced thereby. In addition, a compact design of the gear mechanism having multiple stages with an identical outer diameter can thereby be realized.

Furthermore, the gear mechanism can preferably be self-locking, so that the gear mechanism can be driven as a block or assembly until the self-locking mechanism is overcome.

BRIEF DESCRIPTION OF THE DRAWINGS

The invention is explained below using preferred embodiments with reference to the accompanying figures. They show.

DETAILED DESCRIPTION

Figure 1:
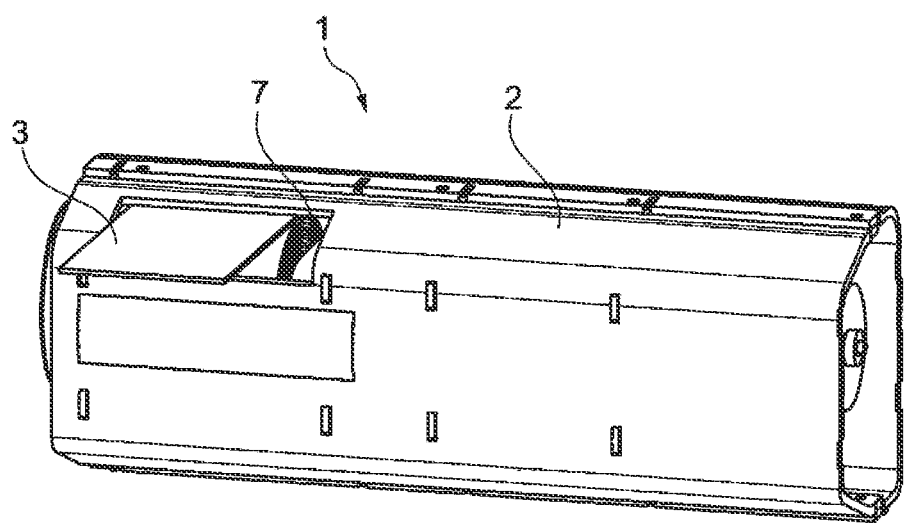
FIG. 1 is a belt retractor according to the invention having a closed housing.

FIG. 1 shows the belt retractor 1 according to the invention having a two-part closed housing 2. The housing 2 has an outlet opening 7 through which a safety belt 3 extends outwards. The belt retractor 1 is deliberately designed very compactly in an elongate form so that it can also be arranged in restricted installation space conditions such as, for example, in an upper section of a backrest. The belt retractor 1 is fixed to the vehicle via the housing 2, for example fastened to the seat structure, via which the restraining forces occurring during an accident are then absorbed. However, the belt retractor 1 can also be arranged in other confined spaces of the vehicle if this is more favorable for the restraint of the occupant or is advantageous in the sense of a more favorable production of the vehicle. The housing 2 is formed in tubular form in two parts from two half shells, with a closed cross section and is used, in addition to fastening the belt retractor 1 to the vehicle, for protecting and holding the further components of the belt retractor 1 described below.

Figure 2:
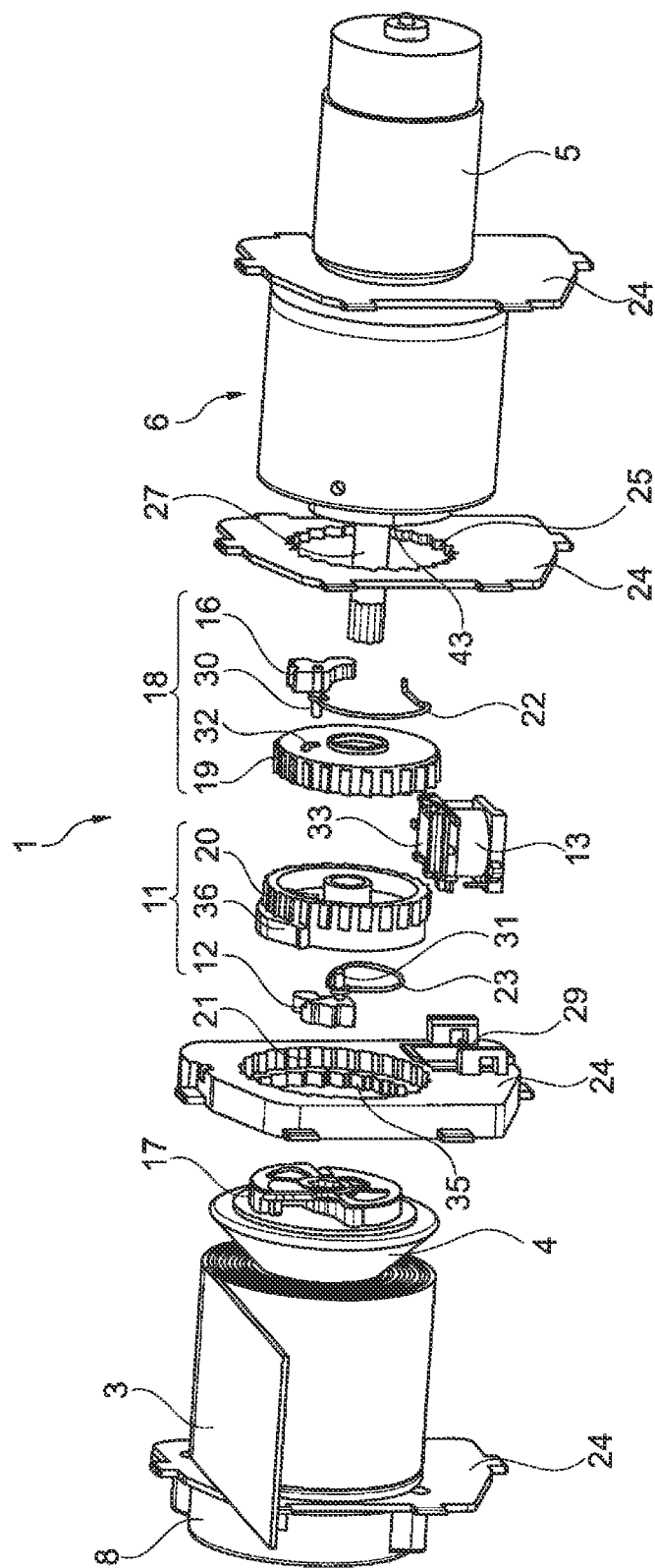
FIG. 2 is a belt retractor according to the invention in an exploded view.
Figure 3:
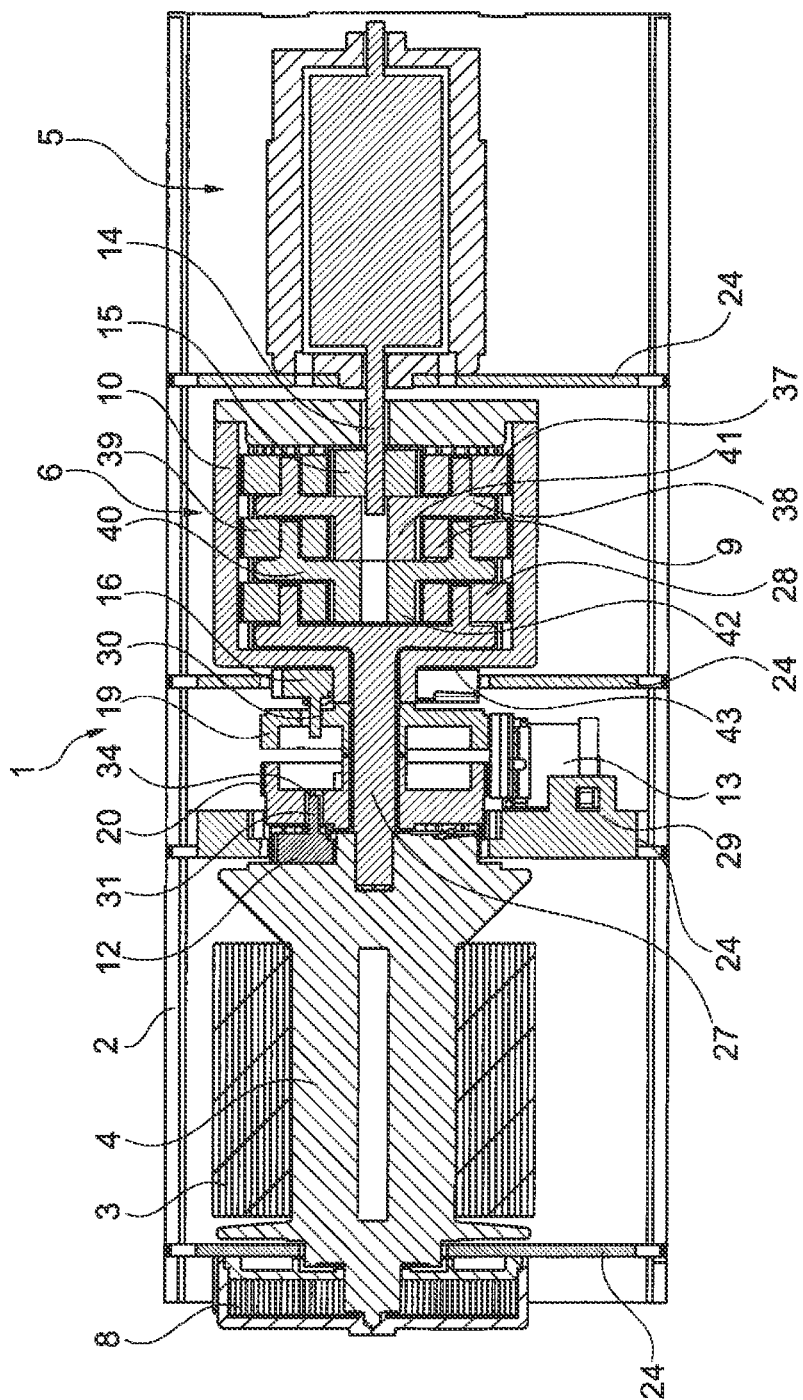
FIG. 3 is a belt retractor according to the invention in a sectional view.

FIG. 2 shows the belt retractor 1 with its individual parts in an exploded view without the housing 2. FIG. 3 shows the belt retractor 1 with the housing 2 in a sectional view. The belt retractor 1 has a plurality of webs 24, which are supported in the housing 2 and are used for supporting and holding the components in the housing 2. Furthermore, the webs 24 bring about a stiffening of the entire assembly with the housing 2, so that the forces to be absorbed can be absorbed more favorably and introduced into the vehicle structure.

The safety belt 3 is wound on a belt shaft 4, which is spring-loaded in the winding direction of the safety belt 3 by a drive spring of a drive spring assembly 8, which is supported on the housing 2 via one of the webs 24. The belt shaft 4 also has a profile head 17 which is formed integrally therewith and is the carrier of a second blocking pawl 12 pivotably mounted thereon. Furthermore, the belt shaft 4 is mounted on both sides in each case on a web 24, wherein the web 24 on the right in the illustration is additionally provided with two toothings 21 and 35, the teeth of which are each directed in the winding direction of the safety belt 3 on the belt shaft 4. Furthermore, a second control disk 20 is provided, which has a control contour 34 in the form of a curved recess, which can be seen only in FIG. 3, and a toothing directed against the pull-out direction of the safety belt radially on the outside. The second blocking pawl 12 engages with a pin 31 in the second control contour 34 of the second control disk 20 and is thereby coupled in terms of movement thereto. Furthermore, a second spring 23 is provided, which is held at one end on the profile head 17 of the belt shaft 4 and is held at the other end on the pin 31 of the second blocking pawl 12. The second spring 23 is shaped such that it draws the second blocking pawl 12 toward the profile head 17, so that the second blocking pawl 12 does not engage in the toothing 21, and the belt shaft 4 is therefore not blocked. Furthermore, the second control disk 20 is additionally spring-loaded in the unwinding direction of the safety belt 3 by the spring-loaded second blocking pawl engaging with the pin 31 in the recess 34. The second control disk 20 is further provided with a pivotable inertial mass 36, which is spring-loaded via a spring (not shown) into a position pivoted toward the second control disk 20. The inertial mass 36 forms a WS sensor device and pivots in relation to the second control disk 20 and thereby passes into the toothing 35 of the right-hand web 24 when a belt strap pull-out acceleration defined by the design of the spring is exceeded. As a result of the engagement in the toothing 35, the second control disk 20 is stopped relative to the housing 2 and the rotating belt shaft 4, as a result of which the second blocking pawl 12 is in turn forced into an outward movement due to the pin 31 engaging in the control contour 34. As a result of this outward movement, the second blocking pawl 12 comes into engagement with the toothing 21 of the web 24, and the belt shaft 4 is subsequently blocked against further rotation in the pull-out direction.

Furthermore, a holder 29 for an actuator 13 is provided on the web 24 on which the toothings 21 and 35 are provided, which actuator has a blocking lever 33, which is forced into a pivoting movement counter to a spring force into a deflected position by energization of the actuator 13. In the deflected position, the blocking lever 33 engages with its tip in the toothing of the second control disk 20 and thereby causes the second control disk 20 to stop relative to the belt shaft 4, the profile head 17 and the second blocking pawl 12. Together with the second control disk 20 and the second spring 23, the second blocking pawl 12 forms a second blocking device 11, which is activated according to the above-described sequence and blocks the belt shaft 4 in the pull-out direction when in the activated state. In this case, the actuator 13 is actuated via a signal which is generated as a function of the exceeding of a predefined vehicle deceleration. For this purpose, an external sensor device is preferably provided on the vehicle structure. This sensor device is also referred to as a CS sensor.

The belt retractor 1 further comprises an electric motor 5 and a gear mechanism 6 with a cylindrical outer shape. The belt shaft 4, the gear mechanism 6 and the electric motor 5 are arranged coaxially and in series with respect to one another and thereby form an elongate basic structure, the maximum outer diameter of which, except for the housing 2, is defined by the belt shaft 4 with the safety belt 3 wound up completely thereon.

The electric motor 5 is supported on the housing 2 via one of the webs 24 and has a shaft 14 leading axially out of it. The shaft 14 is connected for conjoint rotation at its end to a first sun gear 15, with which it extends into the gear mechanism 6. In the gear mechanism 6, the first sun gear 15 is in meshing engagement with preferably three first planet gears 37, which are rotatably mounted on a first planet carrier 38 on which a further second sun gear 41 is provided. The second sun gear 41 is in meshing engagement with three second planet gears 39, which are rotatably mounted on a second planet carrier 40. On the second planet carrier 40 there is a further third sun gear 42, which is in meshing engagement with a set of three further third planet gears 28. The third planet gears 28 are rotatably mounted on a third planet carrier 27, which is connected for conjoint rotation to the belt shaft 4. The three planet carriers 41, 42 and 27 each have axially projecting journals which are arranged on an identical diameter and on which the planet gears 37, 39 and 28 are rotatably mounted. Furthermore, the planet gears 37, 39 and 28 each have an identical diameter, and the sun gears 15, 41 and 42 have an identical diameter. The planet gears 37, 39 and 28 mesh on their radial outer side in an internal toothing of a ring gear 10, which simultaneously forms a housing for the gear mechanism 6.

The ring gear 10 has a cylindrical lateral surface on the radial outside with an outer diameter constant in the axial direction and a stepped axial extension 43 with a smaller outer diameter, wherein a first blocking pawl 16 is pivotably mounted on the extension 43. Furthermore, a first control disk 19 is provided with a control contour 32 in the form of a curved recess, into which the first blocking pawl 16 engages with a pin 30. Furthermore, a spring 22 is provided, which is connected by one end to the ring gear 10 and by the other end to the pin 30 of the first blocking pawl 16. The spring is designed such that it draws the first blocking pawl 16 toward the ring gear 10 and at the same time spring-loads the first control disk 19 in the unwinding direction of the safety belt 3. The ring gear 10 extends with the extension 43 and the first blocking pawl 16 through an opening in a web 24, which is provided with an internal toothing 25. Since the spring 22 draws the first blocking pawl 16 toward the ring gear 10, the first blocking pawl 16 is not in engagement with the toothing 25 when the spring 22 is in the relaxed state, and the ring gear 10 can rotate freely relative to the housing 2 and the web 24.

The actuator 13 is arranged such that the blocking lever 33 provided thereon moves not only into the toothing of the second control disk 20 but also into the toothing of the first control disk 19 when pivoting out. As a result, the first control disk 19 is also blocked in relation to a rotational movement of the ring gear 10 in the pull-out direction, and the first blocking pawl 16 is forced counter to the force of the spring 22 into the toothing 25 of the web 24 for a control movement when the first control disk 19 is stopped relative to the ring gear 10.

Together with the first control disk 19, the spring 22 and the toothing 25 in the web 24, the first blocking pawl 16 forms a first blocking device 18. Together with the spring 23, the second control disk 20, the inertial mass 36 and the toothings 21 and 35, the second blocking pawl 12 forms a second blocking device 11. Both the first and the second blocking device 18 and 11 function according to the same principle of actuating the blocking process. One and the same actuator 13 is used for actuating or triggering the blocking process, so that a particularly compact structure of the belt retractor 1 can be realized. The actuator 13 is preferably a signal-controlled actuator 13 which can be actuated by an externally generated electrical signal so that it can be integrated into an electrical control system of the vehicle. Such an actuator 13 can be formed, for example, as in the present exemplary embodiment, by means of an electromagnet and a blocking lever 33 which can be deflected when the electromagnet is energized.

When the electric motor 5 is activated, the belt retractor 1 can be operated in a first function after unbuckling to wind up the safety belt 3 into the parking position (winding aid) at a low rotational speed of 100 to 200 rpm and a low retraction force of approximately 5 to 30 N and thereby supports the drive spring of the drive spring assembly 8. The drive spring in the drive spring assembly 8 can thus be designed with a very much lower retraction force, without the functionally reliable winding of the safety belt 3 being risked as a result. Conversely, this means that a drive spring with a considerably lower retraction force can be used, whereby a considerably greater wearing comfort of the safety belt 3 in the applied state can be realized. To realize this function as a winding aid, the electric motor 5 drives the entire gear mechanism 6 as an assembly without the components of the planetary gear mechanism 9 in the toothings executing a movement relative to one another. The planetary gear mechanism 9 is rotated as a block and in the process transmits the rotational drive movement of the electric motor 5 to the belt shaft 4 at a transmission ratio of 1:1. The gear mechanism 6 is practically deactivated.

If the electric motor 5 is actuated to implement reversible belt tightening in a preliminary phase of a possible accident, it is driven at a rotational speed of 5000 to 30 000 rpm by a higher current supply. In this case, the belt slack is pulled out again at the transmission ratio of 1:1 in a very short initial phase, until the counterforce to be overcome in the safety belt 3 has risen to such an extent that a further tightening of the safety belt 3 with the low retraction force is no longer possible. The third planet carrier 27 is thus blocked via the belt shaft 4 and cannot execute any further rotational movement in the retraction direction. At the same time, however, the planet gears 28 rotatably mounted on the third planet carrier 27 are driven further in a rotational movement via the third sun gear 42. Since the third planet gears 28 can still rotate about their own axes of rotation but cannot revolve any longer due to the blocked third planet carrier 27, the torque of the third planet gears 28 is supported on the internal toothing of the ring gear 10. The third planet gears 28 can thus only execute the rotational movement when they drive the ring gear 10 via the internal toothing in a rotational movement in the pull-out direction of the safety belt 3. This rotational movement of the ring gear 10 is also transmitted via the spring 22 and the first blocking pawl 16 to the first control disk 19.

The higher current supply to the electric motor 5 for the reversible belt tightening takes place on the basis of a signal, which takes place by sensing a characteristic variable, on the basis of which the presence of an accident preliminary stage, i.e. a risky driving situation, can be deduced. This signal can then also be used to actuate the actuator 13, so that the blocking lever 33 of the actuator 13 is already pivoted out or is pivoted out directly and, by engaging in the toothing of the first control disk 19, blocks a further rotational movement of the first control disk 19 relative to the ring gear 10 in the pull-out direction. As a result, the first blocking pawl 16 is forced into the toothing 25 of the web 24 for a control movement, and the ring gear 10 is subsequently blocked against further rotational movement in the pull-out direction of the safety belt 3. This blocking of the ring gear 10 then means that the rotational drive movement of the electric motor 5 can then be further transmitted only when the planet carriers 38, 40 and 27 with the planet gears 37, 39 and 28 rotatably mounted thereon revolve or rotate relative to the ring gear 10. The stages of the planetary gear mechanism 9 are thus practically activated, and the rotational movement of the shaft 14 of 5000 to 30,000 rpm is reduced in a reduction ratio of i=30 to 80 into a slower rotational speed of the third planetary carrier 27 of 60 to 10,000 rpm. At the same time, the retraction force exerted on the belt shaft 4 and thus on the safety belt 3 is increased to 150 to 800 N thereby. The brief reversal in the rotational direction of the ring gear 10 and of the first control disk 19 coupled thereto is used here solely to trigger the blocking movement of the first blocking pawl 16 by virtue of the blocking lever 33 engaging in the toothing of the first control disk 16 and blocking the first control disk 19, while the relative movement required for triggering the blocking movement is realized by the continuing rotation of the ring gear 10 in the pull-out direction relative to the first control disk 19. To deactivate the gear mechanism 6, it is sufficient if the electric motor 5 is deactivated and the retraction force exerted on the safety belt 3 decreases, thus the safety belt 3 is practically loosened again. Owing to the resulting rotational movement of the belt shaft 4 and the ring gear 10 in the pull-out direction, the first blocking pawl 16 disengages from the toothing 25 of the web 24, and the ring gear 10 is released again.

The first and second blocking devices 18 and 11 are activated by a common actuator 13. The functions do not hinder one another, since the belt shaft 4 is driven in the winding direction when the first blocking device 18 is activated during the reversible belt tightening, so that the second control disk 20 also rotates in the retraction direction, and the second blocking device 11 is therefore deliberately not activated. In the reverse case, i.e. when the second blocking device 11 is activated, the belt shaft 4, and thus also the first control disk 19 via the coupling to the first blocking pawl 16, also rotates briefly in the pull-out direction. In this case, although the first blocking device 18 can be activated, a possible blocking of the ring gear 10 is not disadvantageous, since the gear mechanism 6 is excluded from the force flow anyway by the activated second blocking device 11.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor, comprising
a belt shaft, which is rotatably mounted in a housing that can be fastened to a vehicle and on which a safety belt can be wound,
an electric motor for driving the belt shaft into a rotational movement, and
a gear mechanism, which transmits the rotational movement from the electric motor to the belt shaft,
wherein a first blocking device is provided, which, when activated, blocks at least one of the parts of the gear mechanism and as a result activates the gear mechanism, and
the first blocking device can be activated by a signal-controlled actuator, and wherein
the actuator, in a second function, activates a second blocking device when a predefined pull-out acceleration of the safety belt is exceeded or a predefined vehicle deceleration is exceeded.

2. The belt retractor according to claim 1, wherein
the first blocking device comprises a first blocking pawl which, when activated, blocks at least one part of the gear mechanism in the pull-out direction of the safety belt by engagement in a first toothing fixed to the housing.

3. The belt retractor according to claim 2, wherein
the first and second blocking devices have two independent control disks, which each have a control contour and each have a toothing, which are rotatably mounted and spring-loaded by means of a spring relative to the belt shaft, wherein the first and second blocking pawls bear against the control contour and, when a movement relative to the control disks is executed, execute a movement forced by the control contour, and wherein the actuator has a blocking lever which can be deflected in a signal-controlled manner and activates the first and second blocking devices, by engaging in the toothings of the control disks and by means of a movement of the control disks relative to the blocking pawls forced counter to the force of the spring.

4. The belt retractor according to claim 1, wherein the second blocking device comprises a second blocking pawl which, when activated, blocks the belt shaft in the pull-out direction of the safety belt by engagement in a second toothing fixed to the housing.

5. The belt retractor according to claim 1, wherein the gear mechanism is formed by a planetary gear mechanism.

6. The belt retractor according to claim 5, wherein the belt shaft is connected for conjoint rotation to a planet carrier, which is a carrier of a plurality of toothed planet gears rotatably mounted thereon, and in that the part which can be blocked by the first blocking device is a toothed ring gear in which the toothings of the planet gears mesh.

7. The belt retractor according to claim 5, wherein the planetary gear mechanism is a multi-stage planetary gear mechanism.

8. The belt retractor according to claim 7, wherein the stages of the planetary gear mechanism have sun gears and planet gears with identical diameters.

9. The belt retractor according to claim 1, wherein the gear mechanism is self-locking.

* * * * *